United States Patent [19]

Notter et al.

[11] Patent Number: 5,310,293

[45] Date of Patent: May 10, 1994

[54] DRILL BIT WITH CUTTING INSERT

[76] Inventors: Theo A. Notter, 29 Langley Drive, Camberley, Surrey, GU15 3TB, England; David W. James, 68 Derby Square, Douglas, Isle of Man, Isle of Man

[21] Appl. No.: 13,719

[22] Filed: Feb. 4, 1993

Related U.S. Application Data

[60] Division of Ser. No. 758,162, Sep. 11, 1991, Pat. No. 5,195,404, which is a continuation of Ser. No. 209,223, Jun. 20, 1988, abandoned.

[30] Foreign Application Priority Data

Jun. 18, 1987 [GB] United Kingdom ............... 8714340

[51] Int. Cl.$^5$ ............................................. B23B 51/02
[52] U.S. Cl. .................... 408/145; 407/119; 408/230
[58] Field of Search ............ 408/144, 145, 227, 230; 76/108.6; 407/118, 119

[56] References Cited

U.S. PATENT DOCUMENTS

| | | | |
|---|---|---|---|
| 4,671,710 | 6/1987 | Araki | 408/145 |
| 4,679,971 | 7/1987 | Maier | 408/145 |
| 5,195,404 | 3/1993 | Notter et al. | 408/145 |

FOREIGN PATENT DOCUMENTS

| | | | |
|---|---|---|---|
| 1123205 | 5/1982 | Canada | 408/145 |
| 66805 | 4/1982 | Japan | 408/144 |

Primary Examiner—Daniel W. Howell
Attorney, Agent, or Firm—Scully, Scott, Murphy & Presser

[57] ABSTRACT

The invention provides a method of manufacturing a twist drill having a cutting insert. The method includes the steps of providing a cutting insert which has a prismatic shape and which comprises a layer of abrasive compact which is bonded to a cemented carbide backing. The insert has on a first facet a cutting edge formed by the abrasive compact layer, and on a second facet a seating surface formed predominantly by the cemented carbide backing. The first and second facets define a predetermined first angle with each other. A twist drill is provided, having a seat in its flank. The seat defines a support surface adapted to receive a seating surface of the insert, and is inclined at a predetermined second angle to the face of the drill. The insert is bonded into the seat, so that the cutting edge of the insert defines the major cutting edge of the drill and the first facet of the insert coincides with the face of the drill. The invention includes cutting inserts and twist drills produced by the method.

13 Claims, 3 Drawing Sheets

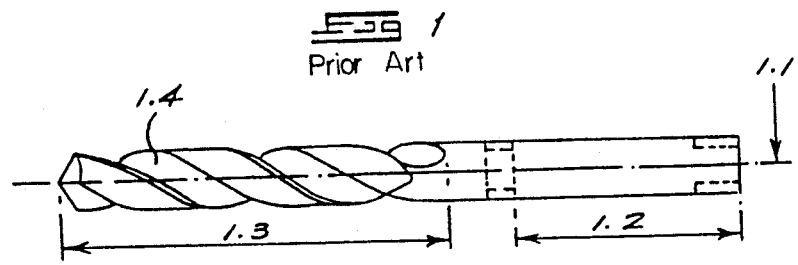
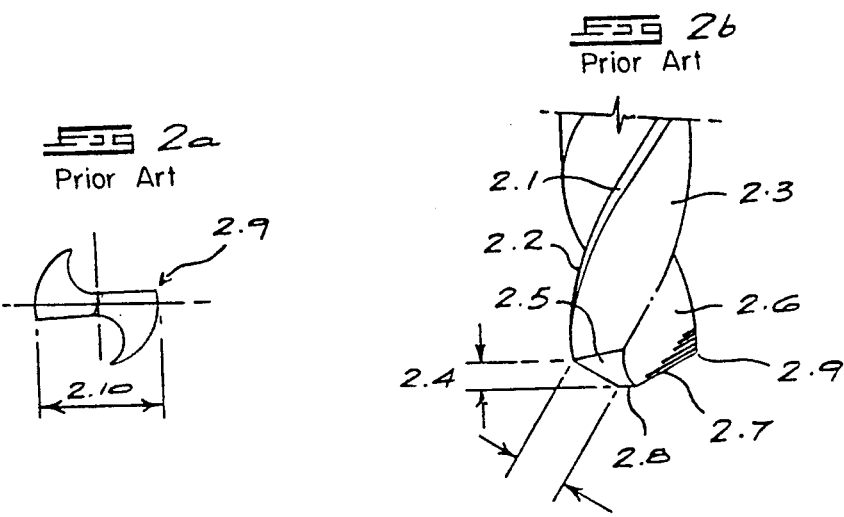
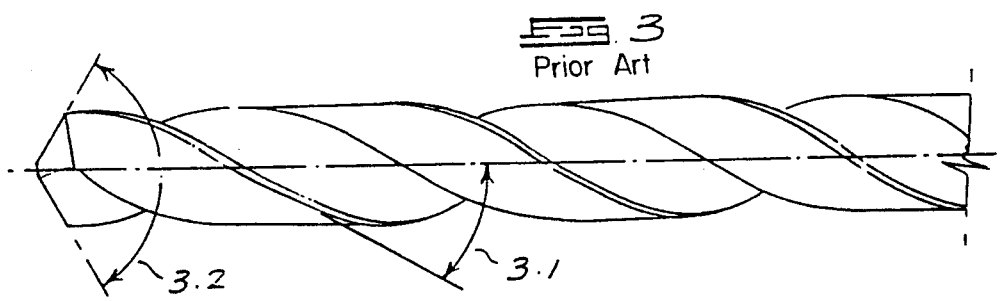
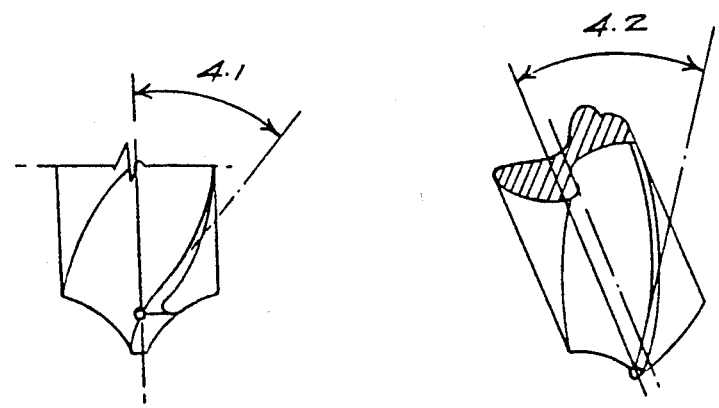

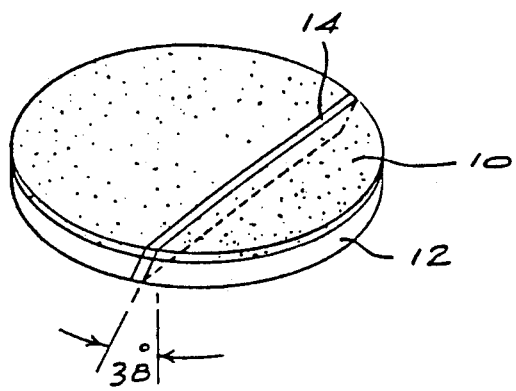
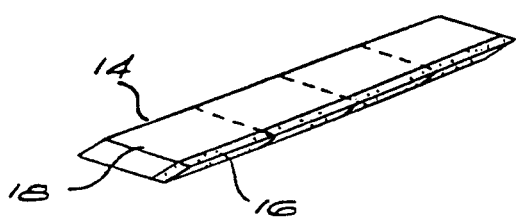
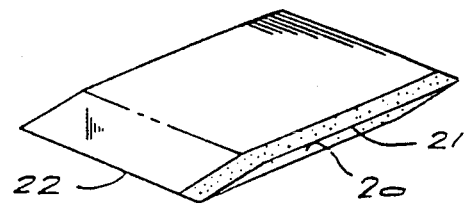
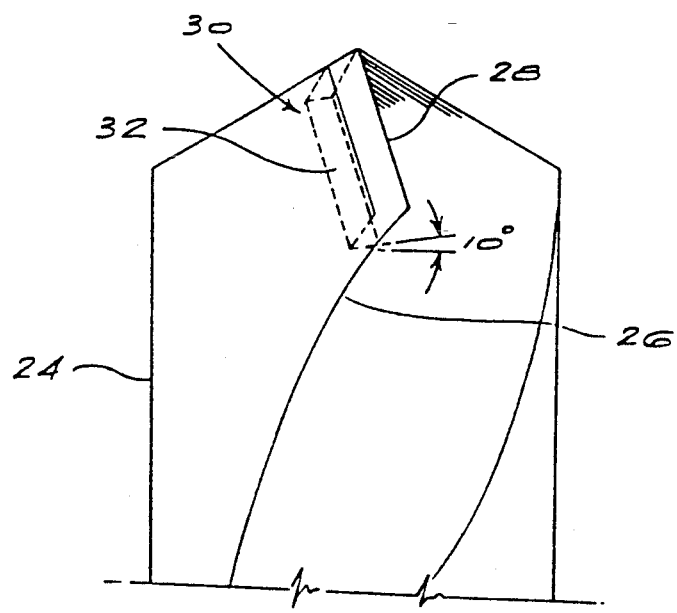

DRILL BIT WITH CUTTING INSERT

This is a divisional of copending application Ser. No. 758,162, filed Sep. 11, 1991, now U.S. Pat. No. 5,195,404, which is a continuation of prior application Ser. No. 209,223, filed Jun. 20, 1988, now abandoned.

BACKGROUND OF THE INVENTION

This invention relates to a twist drill which has a cutting insert bonded into a seat in the drill.

The life of a twist drill can be extended it if is provided with cutting inserts of very hard or abrasive material. It is known to provide a slot in the cutting end of the drill, into which a cutting insert is located and bonded by brazing. The cutting edge or surface of such inserts may be made of diamond abrasive compact.

Because cutting inserts of this kind are very hard, it is usually very difficult to reshape the flute geometry of the twist drill after the insert has been brazed into place. It would be desirable to minimise the amount of machining required to obtain the desired cutting edge and flute geometry after the insert has been fixed to the twist drill.

SUMMARY OF THE INVENTION

According to the invention there is provided a method of manufacturing a twist drill having a cutting insert including the steps of providing a cutting insert which has a prismatic shape and which comprises a layer of abrasive compact which is bonded to a cemented carbide backing, the insert having on a first facet thereof a cutting edge formed by the abrasive compact layer, and on a second facet thereof a seating surface formed predominantly by the cemented carbide backing, the first and second facets defining a predetermined first angle with each other; providing a twist drill having a seat in the flank thereof, the seat defining a support surface adapted to receive the seating surface of the insert, the support surface being inclined at a predetermined second angle to the face of the drill; and bonding the insert into the seat, so that the cutting edge of the insert defines the major cutting edge of the drill and the first facet of the insert coincides with the face of the drill.

Preferably the cutting insert is obtained by cutting an elongate strip from a larger composite abrasive compact body, and cutting the strip into a plurality of cutting inserts.

The composite abrasive compact body may comprise a layer of abrasive compact bonded to a cemented carbide backing layer, the body having at least one flat surface and the strip being cut along parallel planes which are inclined at a predetermined angle to an imaginary plane normal to the flat surface.

In one embodiment the cutting inserts cut from the strip have a seating surface which is rectangular.

In another embodiment the cutting inserts cut from the strip have a seating surface which is triangular.

In this specification, a number of terms are used which have a relatively narrow meaning in relation to twist drills. These terms are defined below, with reference to FIGS. 1 to 4 of the accompanying drawings.

In FIG. 1:

Axis: The longitudinal centre-line of the drill.

Shank: That portion of the drill by which it is held and driven.

Body: That portion of the drill extending from the shank to the chisel edge 2.8.

Flute: A groove in the body of the drill which, at the intersection with the flank 2.5 provides a major cutting edge 2.7, thus permitting removal of chips and allowing cutting fluid to reach the major cutting edge.

In FIG. 2:

Land: The cylindrical or conical leading surface of the drill.

Leading edge of a land (minor cutting edge):

The edge formed by the intersection of a land 2.1 and a flute 1.4.

Body clearance:

The portion of a fluted land reduced in diameter to provide diametral clearance.

Point (cutting part):

The functional part of the drill composed of chip producing elements. The major cutting edges (lips) 2.7, chisel edge 2.8, faces 2.6 and flanks 2.5 are therefore elements of the point or cutting part.

Flank (major flank):

The surface on the drill point bounded by the major cutting edge 2.7, the fluted land 2.1, the following flute and the chisel edge 2.8.

Face: The portion of the surface of a flute adjacent to the major cutting edge 2.7 and on which the chip impinges as it is cut from the workpiece.

Major cutting edge (lip):

The edge formed by the intersection of a flank 2.5 and face 2.6.

Chisel edge:

The edge formed by the intersection of the flanks 2.5.

Outer corner:

The corner formed by the intersection of a major cutting edge 2.7 and the leading edge of the land 2.1.

Drill Diameter:

The measurement across the lands 2.1 at the outer corners 2.9 of the drill measured immediately adjacent to the point 2.4.

In FIG. 3:

Helix angle: The acute angle between the tangent to the helical leading edge and a plane containing the axis and the point in question. This angle lies in a plane normal to the radius at the point on the edge.

Point angle: Twice the angle formed by the drill axis and the projection of a major cutting edge in a plane through the drill axis and parallel to this cutting edge.

In FIG. 4:

Side rake: The angle between a face 2.6 and a plane passing through the selected point on the cutting edge and the drill axis, measured in the plane perpendicular to the radius at the selected point. (When the selected point is the outer corner, this angle is equivalent to the helix angle.)

Normal rake: The angle between a face 2.6 and a plane passing through the selected point on the cutting edge and the drill axis, measured in the plane perpendicular to the cutting edge.

BRIEF DESCRIPTION OF THE DRAWINGS

FIG. 1 shows a conventional twist drill.

FIG. 2a is an end view of the leading end of the twist drill.

FIG. 2b is a side view of the leading end of the twist drill.

FIG. 3 particularly shows the body of the twist drill.

FIGS. 4a and 4b illustrate the side rake and the normal rake of the twist drill.

FIGS. 5 to 8 illustrate a first embodiment of the invention in which a polycrystalline diamond cutting insert is provided in a seat at the point of a twist drill.

DESCRIPTION OF EMBODIMENTS

Figure 9:
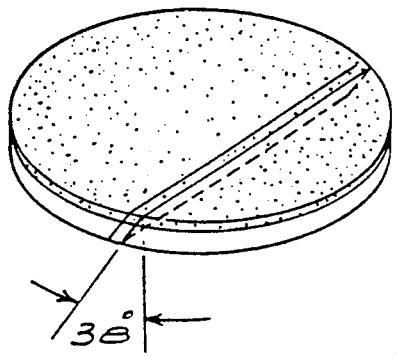
FIGS. 9 to 12 illustrate a second embodiment of the invention.
Figure 10:
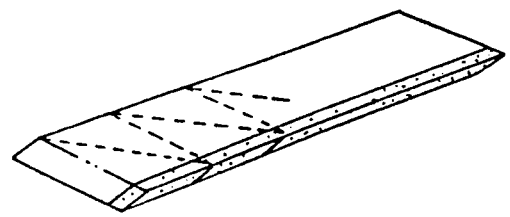

FIG. 5 shows a composite diamond abrasive compact, such as SYNDITE PCD, which is disc shaped and which comprises a PCD layer 10 and an integral tungsten carbide support layer 12. The layer 10 is approximately 0.5-0.7 mm thick, while the layer 12 is several millimeters thick. The compact has flat faces which lie in parallel planes. An elongate strip 14 is cut from the disc along parallel planes which are inclined at an angle of 38° to an imaginary plane normal to the upper surface of the disc. The resulting strip 14 has a PCD layer 16 which has a flat, elongate upper surface, and an integral tungsten carbide backing layer 18 which is considerably thicker than the PCD layer 16.

The strip 14 is cut along the dotted lines in FIG. 6 to produce a number of prismatic cutting inserts, one of which is illustrated in FIG. 7. The insert has a first facet defining a cutting surface 20 of PCD material, and a second facet defining a rectangular seating surface 22 predominantly of tungsten carbide. The first and second facets are inclined, in this case, at 142° to one another (ie. 180°-38°). One edge 21 of the cutting surface 20 will eventually define the major cutting edge of the finished drill.

Referring now to FIG. 8, a standard twist drill 24 has a pair of faces 26 and a pair of major cutting edges (lips) 28 which are symmetrical with respect to the drill axis. Adjacent and parallel to each major cutting edge 28, a radially extending slot 30 of uniform width is cut to define a generally rectangular support surface 32. One side of the slot 30 coincides with the major cutting edge of the drill. The support surface 32 is inclined at 10° to the perpendicular of a plane formed by the major cutting edge and the face.

The angle at which the strip 14 is cut is determined in such a way that when the cutting inserts are brazed into seats provided in the twist drill point, the two inserts on each of the flanks meet up at the drill axis to form the chisel edge of the drill.

The slot 30 and the cutting insert shown in FIG. 7 have complementary shapes, so that when the cutting insert is fitted into the slot and brazed into place, its cutting surface 20 is flush with the face of the drill, and the cutting edge 21 forms the major cutting edge of the finished drill. In the illustrated example, the helix angle of the drill is 28° and the associated side rake and normal rake angles (which vary from point to point along the cutting edge) are of similar magnitude. By inclining the support surface 32 relative to the face of the drill and providing a cutting insert which has a cutting surface 20 which is inclined relative to its seating surface 22 as described, the cutting surface of the completed drill is aligned with the face and is tangential therewith, and the face geometry is maintained.

Figure 11:
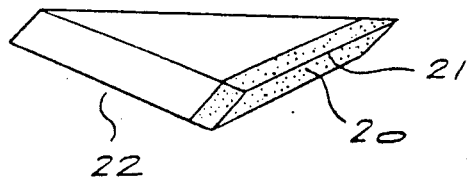
Figure 12:
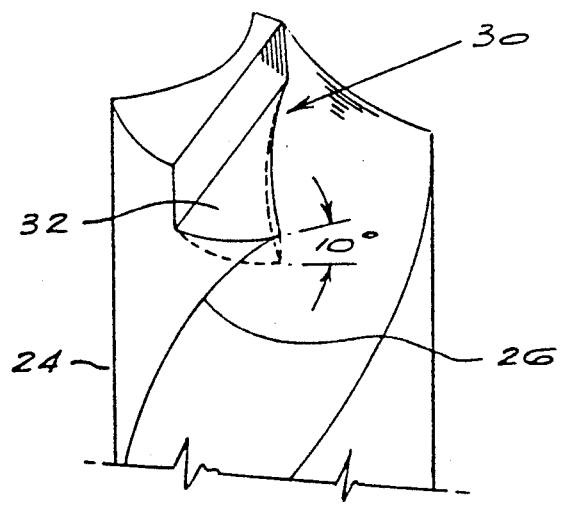

The embodiment illustrated in FIGS. 9 to 12 is similar to that described above, with the major difference that the cutting insert illustrated in FIG. 11 is cut triangularly. The slot 30 adjacent the major cutting edge of the twist drill 24 (see FIG. 12) defines a complementary triangular seating surface which, again, is inclined at 10° relative to a plane which is normal to a plane formed by the major cutting edge and the face.

In both the described embodiments, the forces applied to the cutting inserts in use are compressive forces with respect to the cutting surfaces 20, and shear forces with respect to the seating surfaces 22. This is advantages since the polycrystalline diamond (PCD) layer of the cutting insert is most resistant to compressive stresses, while the brazed interface between the seating surface 22 and the support surface is more resistant to shear stresses than tensile stresses. The embodiment illustrated in FIGS. 9 to 12 has the additional advantage that the area of the bond between the seating surface 22 and the support surface 32 is relatively large.

Further advantages of the described embodiments include the fact that a very small amount of material is used to form the cutting inserts and that very little subsequent grinding or electric discharge machining is required after the inserts have been brazed into place.

We claim:

1. A cutting insert for use with a twist drill of the type having a drill body including a face, a flank, and a seat formed in the flank, the seat defining a support surface to support the cutting insert, and the support surface being inclined at a predetermined angle to the face of the drill, the cutting insert having a prismatic shape and comprising a layer of an abrasive compact bonded to a cemented carbide backing, the cutting insert further having first and second adjacent facets thereon, the second facet being at an inclined angle relative to the first facet, the first facet including a cutting edge formed by the abrasive compact layer, the second facet including a seating surface formed predominantly by the cemented carbide backing, the insert being adapted to be bonded into the seat of the twist drill with the seating surface of the second facet bonded to the support surface of the seat, with the cutting edge of the insert defining a major cutting edge of the drill, and with the first facet of the insert coinciding with the face of the drill.

2. A cutting insert according to claim 1, wherein:

the insert comprises two end faces and a plurality of side faces, each of said end faces is a polygon, said end faces are parallel to each other and have equal sizes and shapes, and each of said side faces is a parallelogram; and one of said side faces comprises the first facet of the insert, and one of said end faces comprises the second facet of the insert.

3. A twist drill comprising:

a drill body including a face, a flank, and a seat formed in a flank, the seat defining a support surface inclined at a predetermined angle to the face of the drill; and a cutting insert having a prismatic shape and comprising a layer of an abrasive compact bonded to a cemented carbide backing, the cutting insert further having first and second adjacent facets thereon, the second facet being at an inclined angle relative to the first facet;

wherein the first facet includes a cutting edge formed by the abrasive compact layer, and the second facet includes a seating surface formed predominantly by the cemented carbide backing; and wherein the insert is positioned in and bonded to the seat of the twist drill, with the seating surface of the second facet being bonded to the support surface of the seat, with the cutting edge of the insert defining a major cutting edge of the drill, and with the first facet of the insert coinciding with the face of the drill.

4. A twist drill (24) comprising cutting inserts bonded into seats (30) formed in the flanks of the drill, each cutting insert comprising first and second adjacent facets which intersect at a predetermined first angle, the first facet providing a cutting edge at its intersection with the face of the drill, the first facet being flush with the flank of the twist drill and the second facet comprising a seating surface bonded to a support surface (32) defined by said seat (30) characterized in that the cutting insert has a prismatic shape and comprises a layer (16) of abrasive compact bonded to a cemented carbide backing (18), the first facet (20) having thereon the cutting edge formed of the abrasive compact layer and the second facet seating surface being formed predominantly of the cemented carbide backing, in that the second facet is at an inclined angle relative to the first facet, and in that the slots provided in the flanks of the twist drill (24) meet in the region of the chisel edge of the drill, and the inserts in the respective slots have adjacent portions which form the chisel edge of the drill.

5. A twist drill according to claim 4, wherein the predetermined first angle is 128° and the support surface is at an angle of 10° relative to a plane which is normal to a plane formed by the major cutting edge and the face.

6. A twist drill according to claim 4, wherein first and second facets (20, 22) of the insert are inclined to each other at an angle of 128°.

7. A twist drill according to claim 4, wherein the end faces of the insert are rectangular.

8. A twist drill according to claim 4, wherein the end faces of the insert are triangular.

9. A cutting insert according to claim 1, wherein the second facet is inclined at an angle of 128° relative to the first facet.

10. A cutting insert according to claim 2, wherein the end faces of the insert are rectangular.

11. A twist drill according to claim 3, wherein the second facet is inclined at an angle of 128° relative to the first facets.

12. A twist drill according to claim 3, wherein:
the cutting insert comprises two end faces and a plurality of side faces, each of said end faces is a polygon, said end faces are parallel to each other and have equal sizes and shapes, and each of said side faces is a parallelogram; and
one of said side faces comprises the first facet of the insert, and one of said end faces comprises the second facet of the insert.

13. A twist drill according to claim 12, wherein the end faces of the insert are rectangular.

* * * * *